United States Patent [19]
Brotz

[11] Patent Number: 5,148,672
[45] Date of Patent: Sep. 22, 1992

[54] PULSE THRUSTER

[76] Inventor: Gregory R. Brotz, P.O. Box 1322, Sheboygan, Wis. 53081

[21] Appl. No.: 481,333

[22] Filed: Feb. 20, 1990

[51] Int. Cl.⁵ .................... F02K 7/02; F02K 11/00
[52] U.S. Cl. ..................... 60/200.1; 60/247; 60/734
[58] Field of Search ............ 60/200.1, 203.1, 204, 60/247, 39.06, 39.76, 734, 248; 123/536, 537; 239/690, 690.1, 692, 695–697, 708

[56] References Cited

U.S. PATENT DOCUMENTS

| | | | |
|---|---|---|---|
| 502,168 | 7/1893 | Battey | 60/200.1 |
| 3,841,824 | 10/1974 | Bethel | 123/536 |
| 4,091,779 | 5/1978 | Saufferer et al. | 123/536 |
| 4,380,978 | 4/1983 | Maynard et al. | 123/536 |

FOREIGN PATENT DOCUMENTS 2092668  8/1982  United Kingdom ............. 123/537

Primary Examiner—Louis J. Casaregola
Attorney, Agent, or Firm—William Nitkin

[57] ABSTRACT

A pulse thruster delivering electrically charged fuel attracted to a plate having an opposite charge where such fuel is ignited, causing an impulse force which process is repeated.

8 Claims, 2 Drawing Sheets

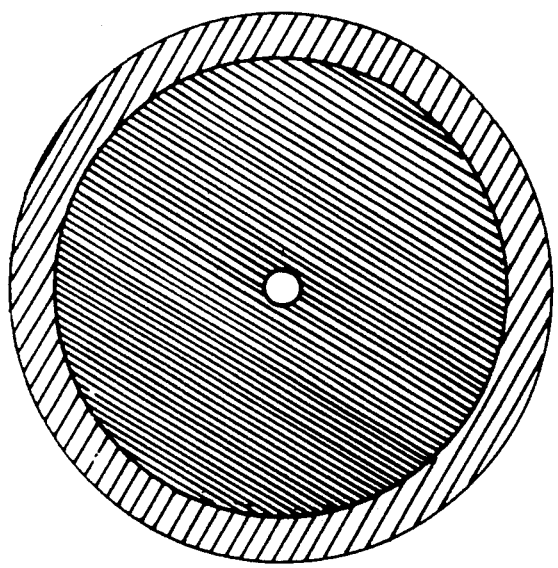
FIG. 4
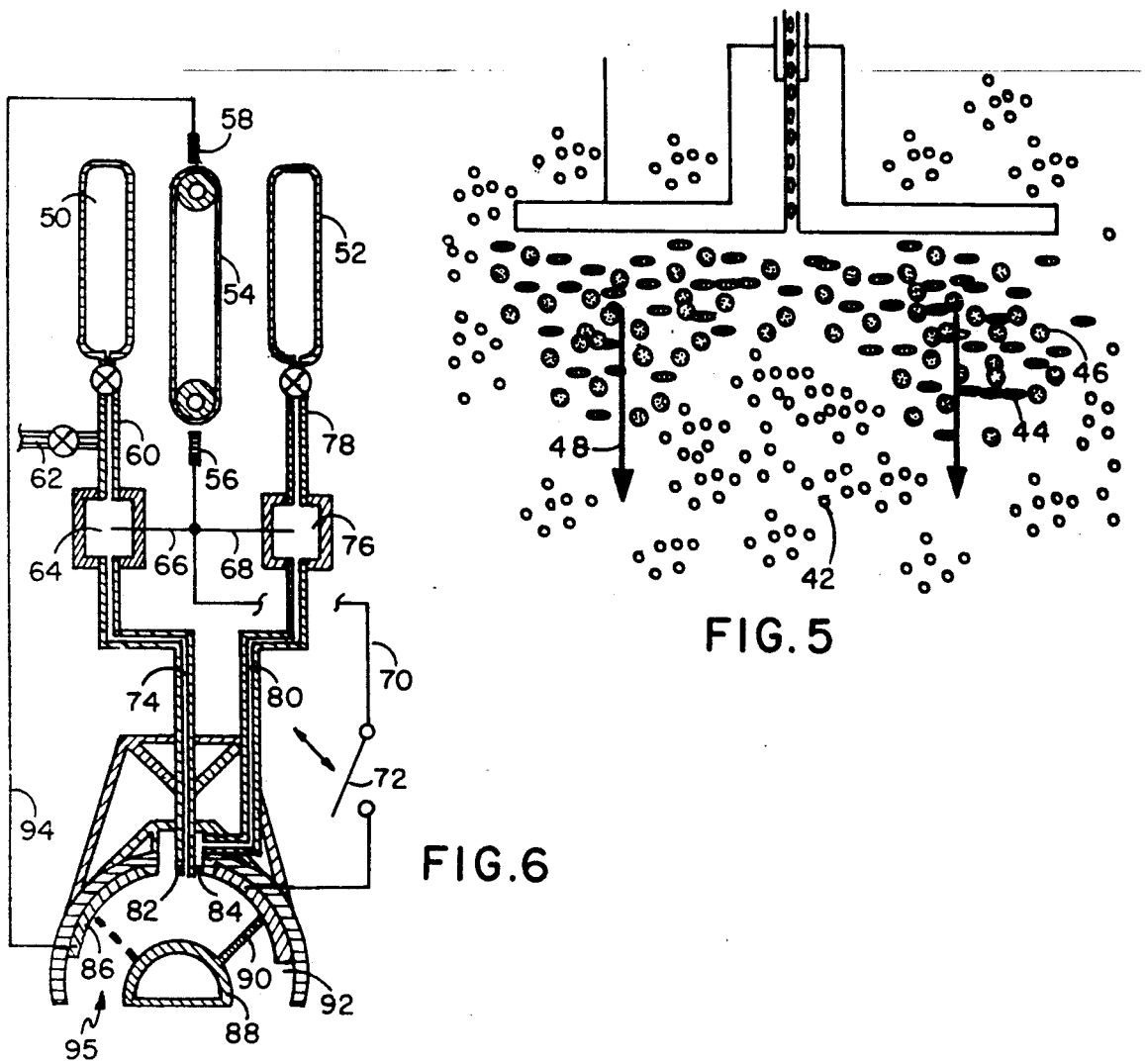
FIG. 5
FIG. 6

PULSE THRUSTER

BACKGROUND OF THE INVENTION

1. Field of the Invention

The device of this invention resides in the area of propulsion devices and more particularly relates to an impulse reaction propulsion device.

2. Description of the Prior Art

Rocket engines are well known in the prior art wherein mixed fuel and an oxidizer ignite, and the explosive reaction exits a nozzle at the rear of the rocket at a force which provides an opposite force to propel the rocket.

SUMMARY OF THE INVENTION

The device of this invention is a pulse thruster wherein molecules of vaporized liquid fuel, such as gasoline, are charged by high-voltage static electricity and directed through a pipe to the surface of a member having a charge opposite the charge of the fuel molecules and against which the charged fuel molecules collect due to the attraction of their opposite charges. A spark is generated at the member's surface which ignites the fuel and oxidizer present in the ambient atmosphere, causing an explosion with some of the reactants of the explosion hitting the member and causing a reactive impulse force which moves the plate in a direction opposite such reactive impulse force.

BRIEF DESCRIPTION OF THE DRAWINGS

FIG. 4 illustrates a bottom plan view of the pulse thruster member

FIG. 5 illustrates a cross-sectional side view of the pulse thruster member with force vectors shown.

FIG. 6 illustrates a cross-sectional side view of a pulse thruster having a concave member with a combustion restrictor element disposed therein.

DESCRIPTION OF THE PREFERRED EMBODIMENT(S)

Figure 1:
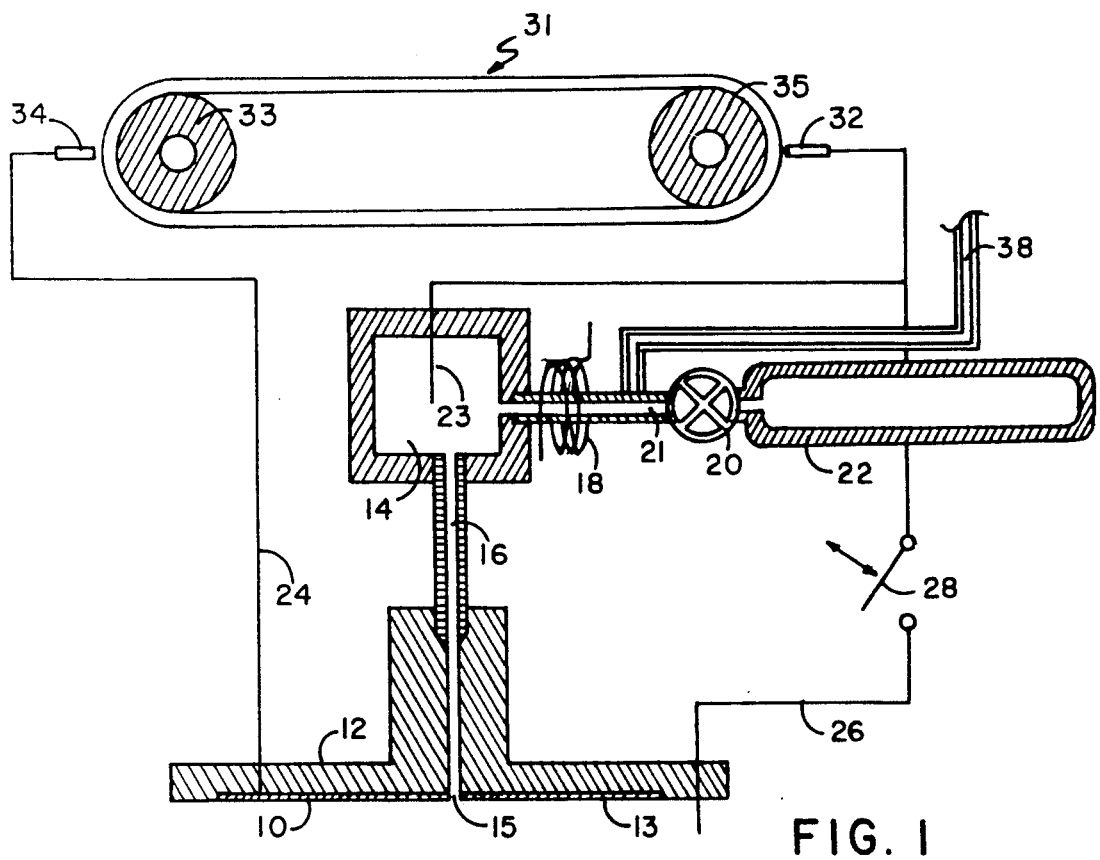
FIG. 1 illustrates a cross-sectional side view of an engine of the type having the pulse thruster of this invention.
Figure 3:
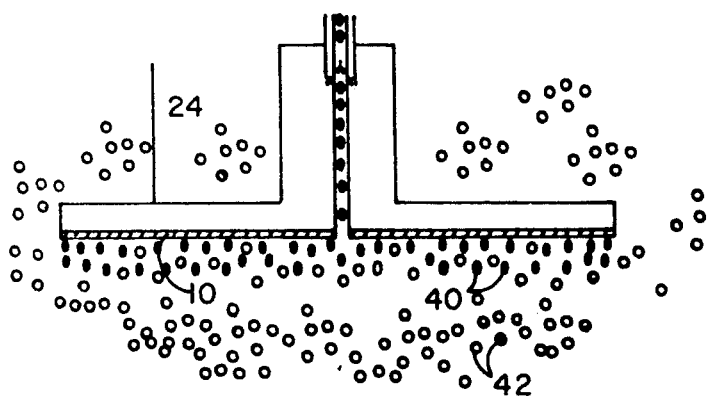
FIG. 3 illustrates a cross-sectional side view of the charged pulse thruster member with ambient air molecules.
Figure 2:
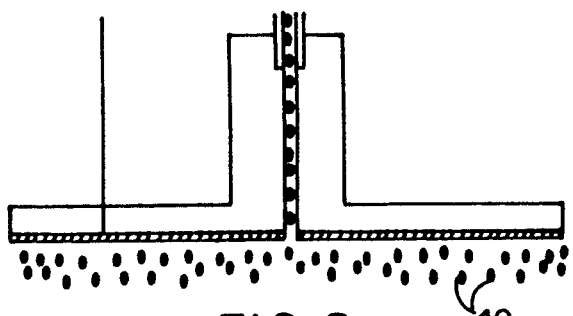
FIG. 2 illustrates a cross-sectional view of charged fuel molecules attracted to the oppositely charged surface of the pulse thruster member.

FIG. 1 illustrates a diagramatical cross-sectional side view through a pulse thruster of this invention. Seen in this view is pulse thruster member 10 which can in one embodiment be generally flat and round as seen in the bottom plan view thereof in FIG. 4. The member of FIG. 1 has at its center aperture 15 which receives electrically charged fuel molecules through pipe 16 extending from fuel-charging chamber 14. The fuel contained in tank 22 is allowed to pass through valve 20 and through tube 21 by a heating coil 18 which heats the fuel as it passes into fuel-charging chamber 14. Fuel-charging chamber 14 has a charging wire probe 23 which extends to static generator 31 as seen in end and top views in FIG. 1. Static generator 31 consists of a belt 30 which is rotated on wheels 33 and 35 by collector brushes 32 and 34 thereby generating a high-voltage static charge on the brushes which is transferred along wires 26 and 24. Wire 26 has a portion thereof which extends to charging wire probe 23 within fuel-charging chamber 14. Wire 26 also extends further through switch 28 to the surface of member 10. Wire 24, carrying an electrical charge opposite that on wire 26, extends from static generator 31 to charging member 10. Along tube 21 is gas engine fuel line 38 which diverts a portion of the fuel along line 38 to a gas engine 36 not shown which drives static generator 31 so as to create positive and negative charges respectively at collector brushes 32 and 34. The fuel, when in fuel-charging chamber 14, picks up the charge of collector brush 32 through charging wire probe 23, and such charged fuel exits through pipe 16 and passes out aperture 15 in the center of member 10 and the charged fuel collects, as seen in FIG. 2, along the surface of member 10. Since the fuel molecules are of the opposite charge from that of the surface of member 10, such fuel, being charged by the opposite static charging electrode than the one interconnected to member 10, as seen in FIG. 2, is attracted to surface 13 of member 10. As seen in FIG. 3, ambient air molecules 42 which contain oxygen are around the structure and can mix with fuel 40. When the device is ready for operation, switch 28 is closed and the charge from static generator 31 through brush 32 also passes down to member 10. A spark jumps from member 10 to the portion of wire 26 extending beyond member 10 which spark ignites the fuel then attracted and mixed with air along the surface of pulse thruster member 10. This ignition creates a force vector 48 as seen in FIG. 5 as all of the particles ignite, creating a force against member 10 and an opposite reactive force in the direction as shown by the force vector arrows. What is left after ignition is the remaining exhaust of carbon dioxide particles 46 and water particles 44. Switch 28 is then opened. At this time further charged fuel passes down pipe 16 through aperture 15 and again comes out onto the surface of member 10 where it is attacted because of its opposite charge, and the process as described above re-occur to create a pulse thruster which will then ignite the fuel when switch 28 is again closed. This sequence continues creating a positive force moving the pulse thruster engine of this invention.

FIG. 6 illustrates an alternate embodiment of the device of this invention wherein the member 86 is concave and has placed therein a dome-like member 88 which acts as a wind protector and combustion restrictor. Charged particles of fuel and oxidizer adhere to the oppositely charged concave thruster member 86 and are ignited by the spark from a high-voltage static generator 54, such as a Van de Graaff generator, by the closure of switch 72. Electrical line 94 extends from brush 58 on one pole of high-voltage static gnerator 54 to concave member 86 while line 70 extends from the oppositely charged brush 56 of high-voltage static generator 54. Line 70 is adapted to extend to near the surface of concave member 86. In this embodiment not only is the fuel contained within the structure in fuel tank 50 but also the oxidizer is carried within tank 52 so that the pulse thruster can operate without the need for an oxidizer in any ambient atmosphere. The fuel and oxidizer can be any well known fuel such as rocket fuel and its associated oxidizer. The fuel and oxidizer pass by flow control valves through lines 60 and 78 respectively into fuel-charging chamber 64 and oxidizer-charging chamber 76 which are interconnected to the charge emanating from brush 56 along line 70 by electrical line 66 extending off line 70 into fuel-charging chamber 64 and electrical line 68 extending off line 70 into oxidizer charging chamber 76. In this manner both the fuel and oxidizer are similarly charged within such chambers from high-voltage static generator 54, and the fuel passes through fuel line 74 and the oxidizer passes through oxidizer line 80 to the base of concave member 86 where the oxidizer can pass out through oxidizer opening 84 and the fuel can pass out through fuel opening 82 where they both are attracted to, and mixed at, oppositely charged concave member 86. Concave member 86 receives its charge along electrical line 94 from the opposite pole brush 58 of high-voltage static generator 54. In this way both charged fuel and charged oxidizer are present along the surface of curved member 86 which can be parabolic or of other curved shape ready for ignition when switch 72 is closed directing the opposite charge from curved member 86 from brush 56 through line 70 to pole 92 near the surface of curved member 86 where the mixture of fuel and oxidizer then explodes, creating the same kind of intermittent pulsed propulsion as discussed above. Dome-like member 88 having a similar curvature to that of curved member 86 can be suspended within the perimeter of curved member 86 by support members 90 spaced away therefrom so as to provide an area 95 therebetween for the combustion products to explode. Dome-like member 88 acts as both a wind protector to prevent the charged particles from being blown away from curved member 86 while they are in the process of accumulating before the spark is intermittently pulsed. There is again a period of time for the electrically charged particles of fuel and oxidized to re-emerge from openings 82 and 84 and reaccumulate on oppositely charged curved member 86. Dome-like member 88 also tends to restrict the combustion to within the curved member which restriction helps to create greater force out the area 95 of combustion. Fuel line 62 also extends off line 60 which runs to the electrostatic generator motor, such as previously discussed, to drive high-voltage static generator 54.

Although the present invention has been described with reference to particular embodiments, it will be apparent to those skilled in the art that variations and modifications can be substituted therefor without departing from the principles and spirit of the invention.

I claim:

1. An impulse reaction propulsion engine comprising:
   an electrically charged surface;
   a fuel, the molecules of which bear an electrical charge of opposite charge to said charged surface;
   means to disperse said charged fuel molecules against said oppositely charged surface in the presence of a fuel oxidizer; and
   means to ignite said molecules to create a reaction against such surface to cause movement of said engine.

2. The device of claim 1 further including:
   a fuel-charging chamber wherein said fuel molecules are charged;
   wherein said charged surface is a member with an aperture defined therein; and
   a fuel line directing said charged fuel from said fuel-charging chamber to said member of opposite electrical charge to that of the electrical charge of said fuel molecules.

3. The device of claim 2 wherein said electrical charge is created by a high-voltage static electrical generator having positive and negative poles with one pole interconnected to said member and the other pole interconnected to said fuel-charging chamber.

4. The device of claim 3 wherein said means to ignite said fuel molecules includes a switch positioned between the surface of said member and said high-voltage static electrical generator wherein after said fuel has been attracted to said member's surface and mixed with said fuel oxidizer and said switch has been closed, a spark is created at said member thereby igniting said fuel and causing a thrust.

5. The device of claim 4 further including:
   a fuel tank holding said fuel and interconnected to said fuel-charging chamber;
   an oxidizer-charging chamber;
   an oxidizer tank holding said oxidizer and interconnected to said oxidizer-charging chamber; and
   a line to deliver said charged oxidizer to said member where it mixes with said charged fuel.

6. The device of claim 4 wherein said member is curved.

7. The device of claim 6 further including a half dome-shaped member spaced away from said member for wind protection and combustion restriction.

8. The device of claim 4 wherein said member is a flat plate.

* * * * *